May 15, 1956  G. EHRHART ET AL  2,745,852
$\Delta^{4,16}$-PREGNADIENE -21-OL-3, 20-DIONES AND PROCESS
Filed July 21, 1952
R = ester radical
R₁ = acid radical or alkyl
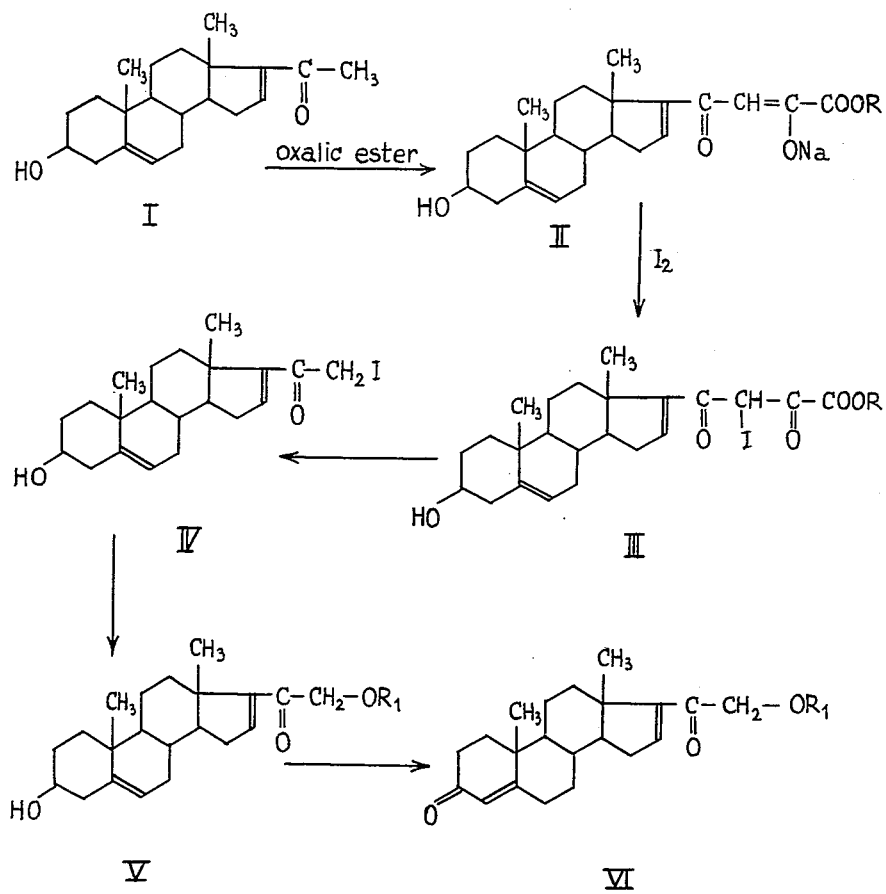
INVENTORS:
GUSTAV EHRHART
HEINRICH RUSCHIG
WERNER HAEDE
BY
Richardson, David and Nordon
Their ATTORNEYS.

United States Patent Office 2,745,852
Patented May 15, 1956

2,745,852
$\Delta^{4,16}$-PREGNADIENE-21-OL-3,20-DIONES AND PROCESS

Gustav Ehrhart, Heinrich Ruschig, and Werner Haede, Frankfurt am Main, Germany, assignors to Farbwerke Hoechst Aktiengesellschaft vormals Meister Lucius und Brüning, Frankfurt am Main-Hochst, Germany, a German company Application July 21, 1952, Serial No. 300,042
Claims priority, application Germany July 27, 1951
6 Claims. (Cl. 260—397.47)

The present invention relates to new compounds of the cyclopentanopolyhydrophenanthrene series, more particularly to derivatives of $\Delta^{4,5;16,17}$-pregnadiene-ol-(21)-dione-(3,20) and a process of preparing such products.

U. S. Patent 2,554,473 describes a process of preparing derivatives of the 21-hydroxy-pregnene-(5)-ol-(3)-one-(20), wherein a pregnene-(5)-ol-(3)-one-(20)-oxalic ester-(21) in the form of its enol alkali salt is treated with iodine and a basic agent and the 21-iodo-pregnene-(5)-ol-(3)-one-(20) obtained is reacted with a salt of an organic acid or another compound capable of replacing iodine.

According to the process described in the copending U. S. application Serial No. 210,097, filed February 8, 1951, now Patent No. 2,609,379, in the name of Heinrich Ruschig for: "Process of preparing 21-iodo-pregnene-(5)-ol-(3)-one-(20)" it is also possible to carry out the acid cleavage of the 21-iodo-pregnene-(5)-ol-(3)-one-(20)-oxalic alkyl ester in a metal alcoholate solution.

Thus, it is possible, for example, to prepare the 21-acetoxy-pregnene-(5)-ol-(3)-one-(20) which is used as a medicament and which may be converted by oxidation of the secondary alcohol group in the 3-position into the acetate of the desoxycorticosterone. This product is a valuable adrenal cortical hormone for therapeutical purposes.

Now, we have found that desoxycorticosterone derivatives having a double bond in the 16,17-position of the molecule can be obtained in a similar way. This is surprising, since it is known that alkali alcoholates are capable of being added to the double bond in $\Delta^{16}$-position. The substances thus obtained, which have a double bond in 16,17-position are, apart from their therapeutical action, important intermediates for the synthesis of glucocorticosteroids. By the process described in German patent application Ser. No. F 8324 IVc/12o, filed on February 11, 1952, the novel compounds of the present invention can be reacted to introduce an epoxide function across the 16–17 position, and these compounds can then be converted to esters of Reichstein's compound S by the process described by Julian et al. in Journal of the American Chemical Society, vol. 72 (1950), p. 5145.

In the following description the Roman numerals refer to the formulas shown in the accompanying drawing.

The process according to the present invention is suitably carried out as follows:

The $\Delta^{5,6;16,17}$-pregnadiene-ol-(3)-one-(20) (see Formula [I]) is condensed with an oxalic ester to form the enol salt of the $\Delta^{5,6;16,17}$-pregnadiene-ol-(3)-one-(20)-oxalic ester-(21) [II]. The condensation is suitably carried out with the aid of sodium- or potassium alcoholate. As solvents there are used with particular advantage those in which the alkali salt of the oxalic ester formed is soluble, but, on the other hand, the alkali alcoholate shows no alkaline reaction, as, for example: benzene, ether, cyclohexane. As oxalic esters there may especially be used methyl-, ethyl- and propyl esters.

The condensation may be carried out at various temperatures, especially at temperatures between 20° C. and 80° C.

The enol salt obtained [II] is, for example, suspended in methanol and a methanolic solution of iodine is added dropwise thereto. The enol salt is thereby dissolved and the 21-iodo-$\Delta^{5,6;16,17}$-pregnadiene-ol-(3)-one-(20)-oxalic esters-(21)[III] are formed which are subjected to an acid cleavage in an alkaline medium. There is obtained the desired 21-iodo-$\Delta^{5,6;16,17}$-pregnadiene-ol-(3)-one-(20) [IV] which is immediately reacted at the neutral point with salts of aliphatic carboxylic acids in a water-miscible solvent. The alkali salts are especially suitable salts. As aliphatic carboxylic acids there may advantageously be used those containing a low aliphatic radical, for example, acetic acid, propionic acid, butyric acid, capronic acid, dimethyl-acetic acid, trimethyl-acetic acid, mono-, di- or trichloro-acetic acids, cyclopentyl-propionic acid or the like. The reaction product [V] is oxidized in known manner to form the derivatives of $\Delta^{4,5;16,17}$-pregnadiene-ol-(21)-dione-(3,20) [VI].

The following examples serve to illustrate the invention but they are not intended to limit it thereto:

EXAMPLE 1

(a) *The sodium enolate of $\Delta^{5,6;16,17}$-pregnadiene-ol-(3)-one-(20)-oxalic ester-(21)*

In a three-necked flask having a capacity of 1000 cc. 10.2 cc. of a solution of 2.5 N-sodium methylate are nearly evaporated to dryness with 50 cc. of benzene while introducing nitrogen and stirring. (Water bath: 100° C.) After cooling, 6 cc. of freshly distilled oxalic diethyl-ester in 100 cc. of absolute ether are caused to run in whereby the evaporation residue is dissolved. After addition of a solution of 6 grams of $\Delta^{5,6;16,17}$-pregnadiene-ol-(3)-one-(20) in 200 cc. of dry benzene and 500 cc. of absolute ether, the reaction mixture is stirred for 4 hours at a water bath temperature of 50–60° C. After cooling, the sodium enolate thus obtained (Formula II) is filtered with suction and washed with ether.

(b) $\Delta^{5,6;16,17}$-*pregnadiene-diol-(3,21)-one-(20)-acetate-(21)*

In the course of 15 minutes and at an internal temperature of —15° C. 4.12 grams of iodine dissolved in 100 cc. of absolute methanol are added, while introducing nitrogen, dropwise to 7.1 grams of the product [II] in 80 cc. of absolute methanol. After stirring for 30 minutes, there are slowly added drop by drop—likewise at a temperature of —15° C.—7.2 cc. of a solution of 2.5 N-sodium methylate. The reaction mixture is heated to room temperature and subsequently stirred for 15 minutes. Thereupon it is filtered and the filtrate is poured into 1.3 liters of water. After some time the 21-iodo compound (Formula IV) which has precipitated, is filtered off with suction or centrifuged. It is then washed with a mixture of water and methanol in the proportion of 7:1. The humid product is boiled for 5 hours—while introducing nitrogen—in a solution of 6.1 cc. of glacial acetic acid, 10.5 grams of potassium acetate in 125 cc. of water and 500 cc. of acetone. The whole is concentrated to about 150 cc. and, after addition of 1.5 liters of ether, several times shaken out with dilute sodium carbonate solution until, after further shaking, no precipitate is formed at the separation surface of ether and water. The ethereal layer is concentrated to 30 cc. whereby the 21-acetate of pregnadiene-diol-one (Formula V) separates. After recrystallization from methanol, the product melts at 176° C. This 21-acetate is dissolved in benzene for further purification and filtered through 5 grams of "acid" aluminum oxide. After evaporation of the benzene, the compound melts at 180° C.; $[\alpha]_D^{20}$: —40.9° C. (in CHCl₃).

(c) $\Delta^{4,5:16,17}$-*pregnadiene-ol-(21)-dione-(3,20)acetate*

0.7 gram of the acetate of pregnadienediolone are boiled with 40 cc. of benzene, 5 cc. of cyclohexanone and 0.7 gram of tertiary aluminum butylate for 2 hours under reflux in the presence of nitrogen. The reaction mixture is poured into water and, after addition of 15 cc. of N-hydrochloric acid, extracted with ether. The ethereal layer is shaken with sodium carbonate solution and dried with sodium sulfate. After distilling off the ether, the residue is heated for a short time under a very reduced pressure to 100° C., dissolved in a mixture of petroleum ether and benzene (2:1) and adsorbed by "acid" aluminum oxide. The oxidation product is dissolved out with benzene, evaporated to dryness and the residue is crystallized from a mixture of cyclohexane and ether (1:1). The $\Delta^{4,5:16,17}$-pregnadiene-ol-(21)-dione-(3,20)-acetate obtained melts at 154° C. and has a $[\alpha]_D^{20}$ of 148° C. in chloroform.

EXAMPLE 2

(a) $\Delta^{5,6:16,17}$-*pregnadiene-diol-(3,21)-one-(20)-trimethyl-acetate-(21)*

21 - iodo - $\Delta^{5,6:16,17}$-pregnadiene-ol-(3)-one-(20) (Formula IV) prepared from 7 grams of the sodium enolate of $\Delta^{5,6:16,17}$ - pregnadiene - ol-(3)-one-(20)-oxalic ester-(21) according to the method described in Example 1b is dissolved, still in the moist state, in 400 cc. of acetone and, after addition of 30 grams of trimethyl-acetic acid and 65 cc. of 2.4 N-caustic soda solution, the whole is boiled for 4 hours under reflux, while introducing nitrogen. The solution is concentrated to 50 cc. and the precipitated crude product is filtered with suction and dried. Thereupon, it is dissolved in 1.5 liters of benzene and the benzene solution is passed through a column of 30 grams of "acid" aluminum oxide. The solution is evaporated to dryness under reduced pressure and the residue is recrystallized from acetone. The $\Delta^{5,6:16,17}$-pregnadiene-diol - (3,21)-one-(20)-trimethyl-acetate-(21) thus obtained which contains water of crystallization melts at 197° C.

(b) $\Delta^{4,5:16,17}$-*pregnadiene-ol-(21)-dione-(3,20)-trimethyl-acetate-(21)*

1 gram of $\Delta^{4,5:16,17}$-pregnadiene-diol-(3,21)-one-(20)-trimethyl-acetate-(21) is dissolved in 80 cc. of benzene. After addition of 6 cc. of cyclohexanone, the solution is concentrated to 40 cc. After dropwise addition of a solution of 0.5 gram of aluminum isopropylate in 5 cc. of benzene, the mixture is boiled for 2 hours under reflux. 0.3 cc. of glacial acetic acid is then added and the cyclohexanone and other volatile reaction products are removed by distillation with steam. The residue is taken up in ethyl acetate and washed first with dilute sulfuric acid and then with caustic soda solution. The ethyl acetate solution is dried and the ethyl acetate is distilled off under reduced pressure. The residue is recrystallized from ether. The $\Delta^{4,5:16,17}$ - pregna-diene-ol-(21)-dione-(3,20)-trimethyl-acetate-(21) obtained melts at 157° C.

EXAMPLE 3

(a) $\Delta^{5,6:16,17}$-*pregnadiene-diol-(3,21)-one-(20)-β-cyclopentyl-propionate-(21)*

21-iodo-$\Delta^{5,6:16,17}$-pregnadiene-ol-(3)-one-(20) obtained from 7 grams of the sodium enolate of $\Delta^{5,6:16,17}$-pregnadiene-ol-(3)-one-(20)-oxalic ester-(21) according to the method described in Example 1b is dissolved, still in the moist state, in 400 cc. of acetone, and, after addition of 40 grams of β-cyclopentyl-propionic acid and 65 cc. of 2.4 N-caustic soda solution the whole is boiled for 4 hours under reflux while introducing nitrogen. The product is worked up in a manner analogous to that of Example 2a. The $\Delta^{5,6:16,17}$-pregnadiene-diol-(3,21)-one-(20)-β-cyclopentylpropionate-(21) is obtained, which also persistently retains the water of crystallization and has a melting point of 168° C.

(b) $\Delta^{4,5:16,17}$-*pregnadiene-ol-(21)-dione-(3,20)-β-cyclopentyl-propionate-(21)*

1 gram of $\Delta^{5,6:16,17}$-pregnadiene-diol-(3,21)-one-(20)-β-cyclopentyl-propionate-(21) is dissolved in 80 cc. of benzene. After addition of 6 cc. of cyclohexanone the solution is concentrated to 40 cc. After dropwise addition of a solution of 0.5 gram of aluminum isopropylate in 5 cc. of benzene, the mixture is boiled for 2 hours under reflux. 0.3 cc. of glacial acetic acid is then added and the cyclohexanone and other volatile reaction products are removed by distillation with steam. The residue is taken up in ethyl acetate and washed first with dilute sulfuric acid and then with caustic soda solution. The ethyl acetate solution is dried and the ethyl acetate is distilled off under reduced pressure. The residue is recrystallized from ether. The $\Delta^{4,5:16,17}$-pregnadiene-ol-(21)-dione-(20)-β-cyclopentyl-propionate-(21) obtained melts at 122° C.

We claim:

1. The compounds of the general formula

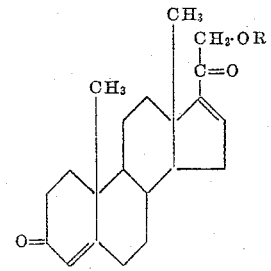

wherein R stands for a lower hydrocarbon carboxylic acid radical having at most 8 carbon atoms.

2. The compound of the formula

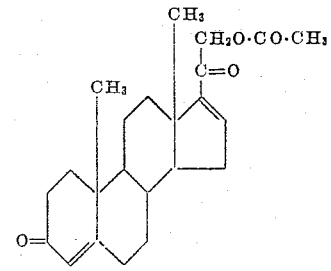

3. The compound of the formula

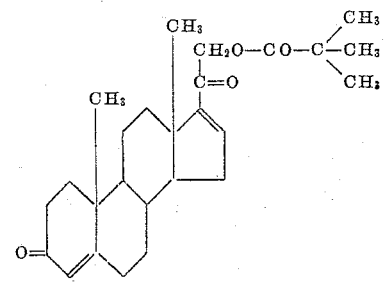

4. The compound of the formula

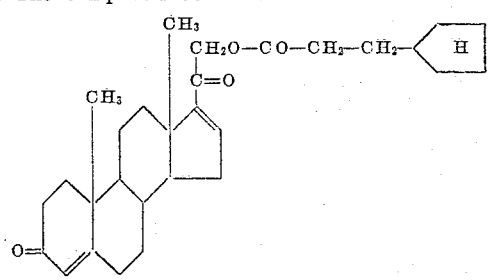

5. Process for the manufacture of derivatives of $\Delta^{4,5:16,17}$-pregnadiene-ol-(21)-dione-(3,20) which comprises condensing $\Delta^{5,6:16,17}$-pregnadiene-ol-(3)-one-(20) with oxalic esters, in the presence of an indifferent organic solvent, treating the $\Delta^{5,6:16,17}$-pregnadiene-ol-(3)-one-(20)-oxalic esters-(21) obtained in the form of their enol alkali salts with iodine, subjecting the 21-iodo-$\Delta^{5,6:16,17}$-pregnadiene-ol-(3)-one-(20)-oxalic esters-(21) obtained to an acid cleavage, reacting the 21-iodo-$\Delta^{5,6:16,17}$-pregnadiene-ol-(3)-one-(20) obtained with salts of aliphatic carboxylic acids and oxidizing the reaction products obtained to form derivatives of $\Delta^{4,5:16,17}$-pregnadione-ol-(21)-dione-(3,20).

6. The process for the manufacture of derivatives of $\Delta^{4,5:16,17}$-pregnadiene-ol-(21)-dione-(3,20) which comprises condensing $\Delta^{5,6:16,17}$-pregnadiene-ol-(3)-one-(20) with oxalic esters, in the presence of an alkali metal alcoholate and a solvent selected from the group consisting of benzene, ether, and cyclohexane, treating the $\Delta^{5,6:16,17}$-pregnadiene-ol-(3)-one-(20)-oxalic-esters-(21) obtained in the form of their enol alkali metal salts with iodine, subjecting the 21-iodo-$\Delta^{5,6:16,17}$-pregnadiene-ol-(3)-one-(20)-oxalic esters-(21) obtained to an acid cleavage, reacting the 21-iodo-$\Delta^{5,6:16,17}$-pregnadiene-ol-(3)-one-(20) obtained with salts of aliphatic carboxylic acids and oxidizing the reaction products obtained to form derivatives of $\Delta^{4,5:16,17}$-pregnadiene-ol-(21)-dione-(3,20).

References Cited in the file of this patent

UNITED STATES PATENTS

| 2,420,489 | Marker | May 13, 1947 |
| 2,420,490 | Marker | May 13, 1947 |
| 2,554,473 | Ruschig | May 22, 1951 |

OTHER REFERENCES

Meyer et al.: Helv. Chim. Acta 30, 1508–1522 (1947).
Fieser et al.: Natural Products Related to Phenanthrene, 3rd ed., pp. 390–392, 424–426 (1949).